March 23, 1937. V. T. GROVER 2,074,330
SHEET HANDLING AND FEEDING APPARATUS
Filed Sept. 22, 1933 9 Sheets-Sheet 3

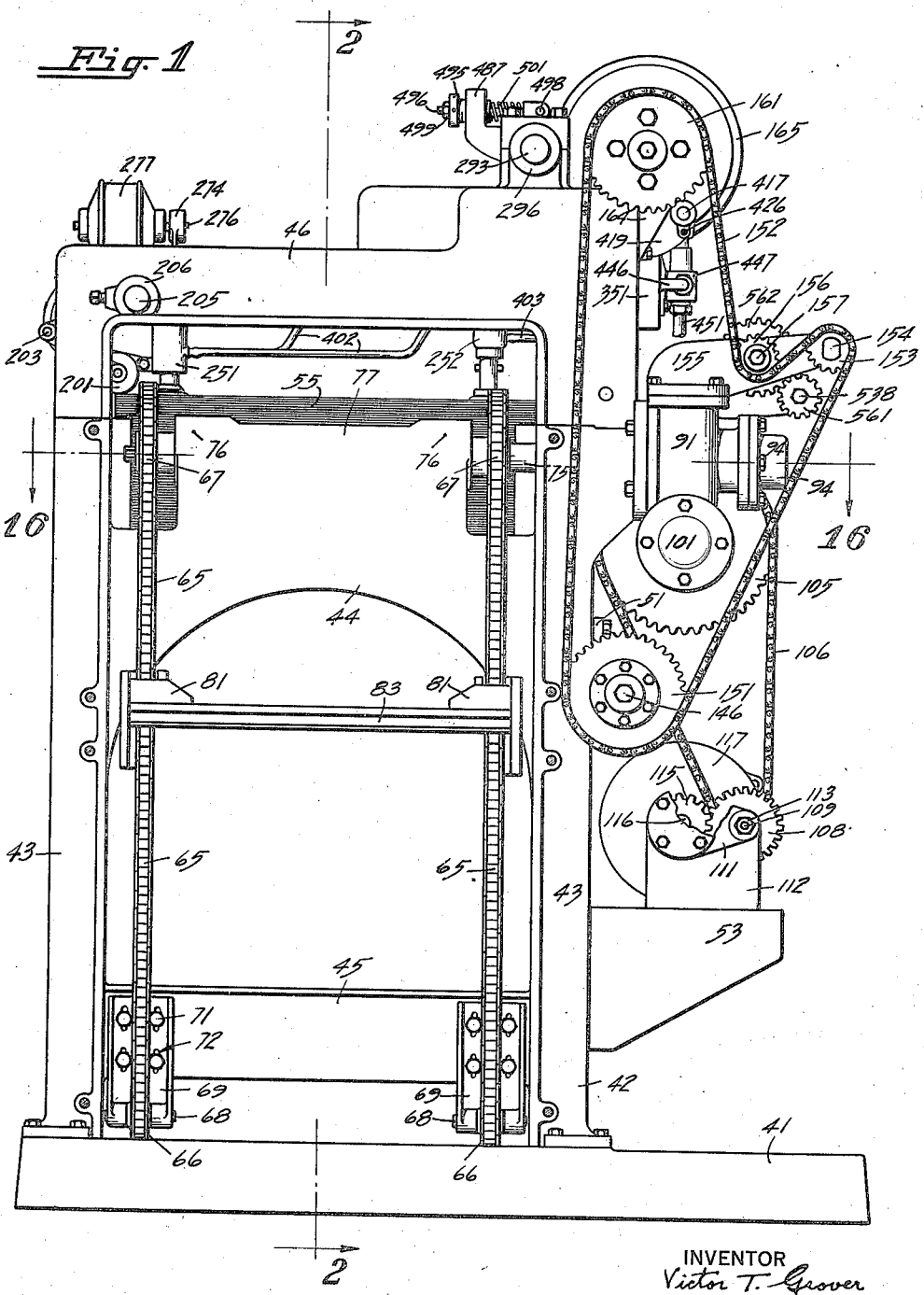

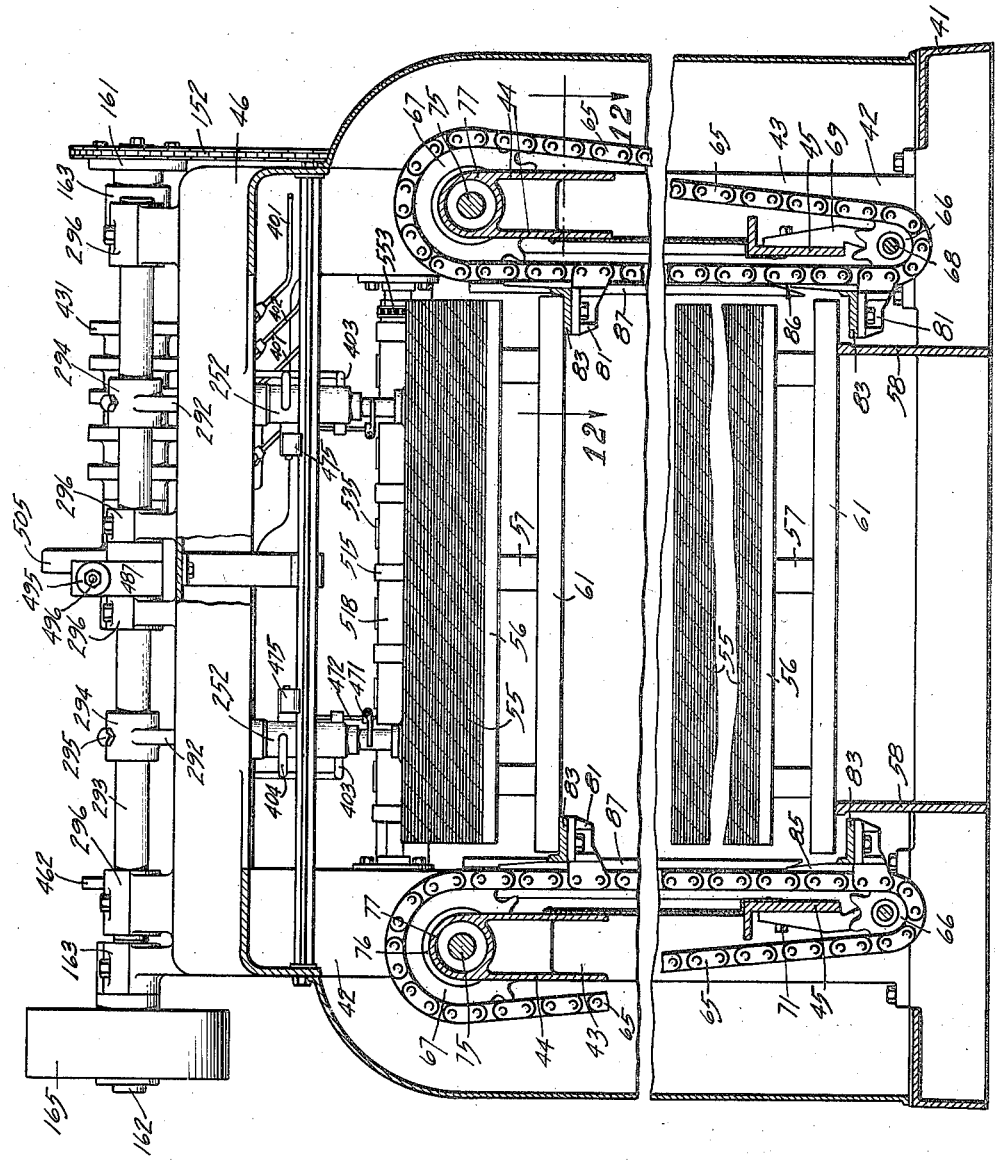

INVENTOR
Victor T. Grover
BY Ivan D. Thornburgh
Charles H. Line
ATTORNEYS

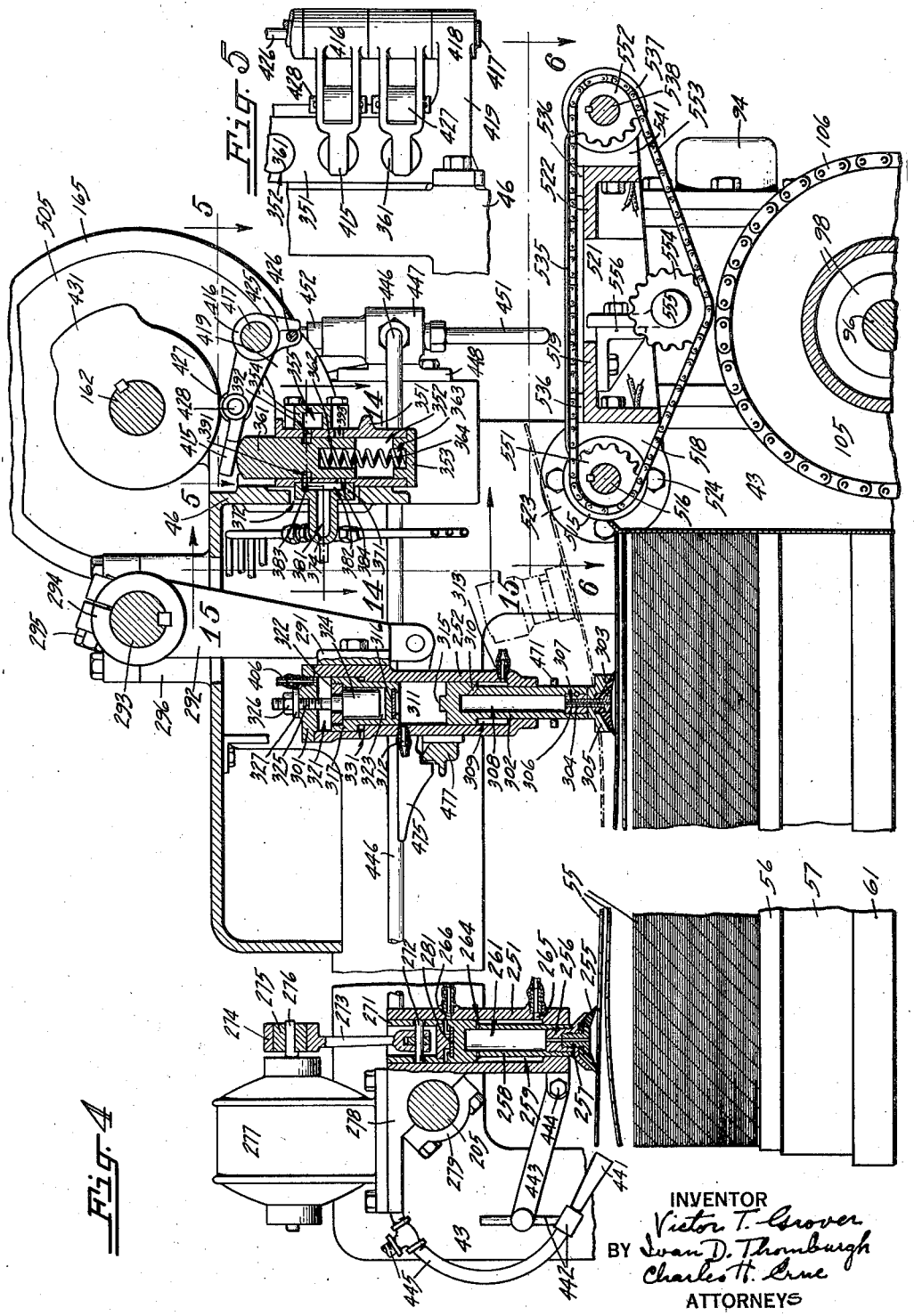

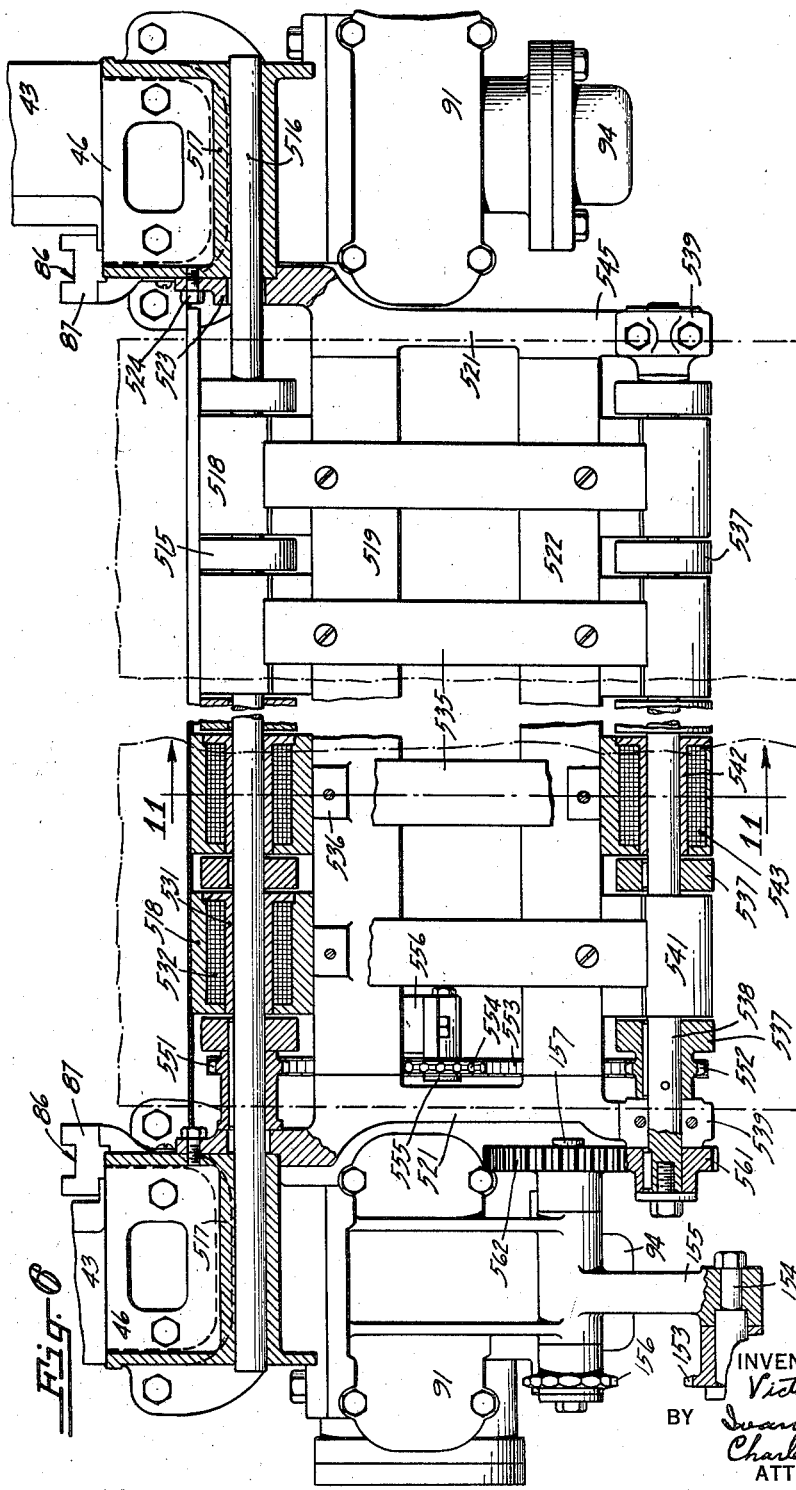

March 23, 1937. V. T. GROVER 2,074,330
SHEET HANDLING AND FEEDING APPARATUS
Filed Sept. 22, 1933   9 Sheets-Sheet 6

INVENTOR
Victor T. Grover
BY Ivan D. Thornburgh
Charles H. Line
ATTORNEYS

March 23, 1937. V. T. GROVER 2,074,330
SHEET HANDLING AND FEEDING APPARATUS
Filed Sept. 22, 1933 9 Sheets-Sheet 7
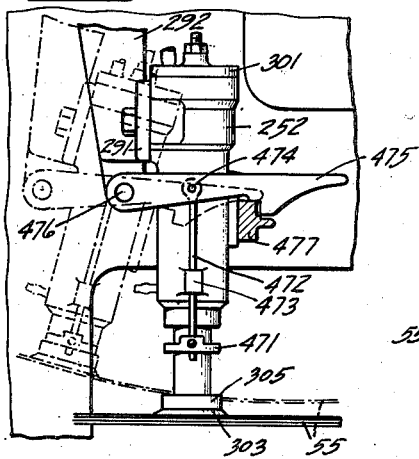
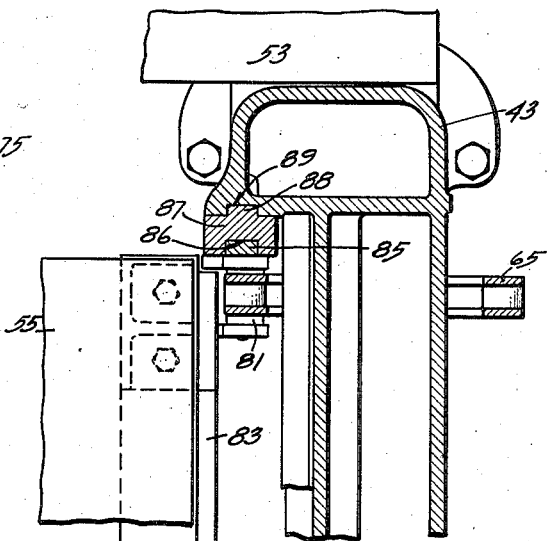
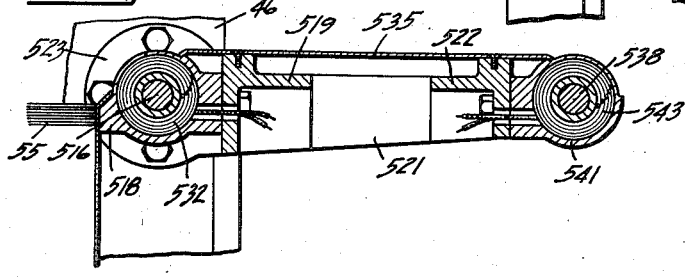
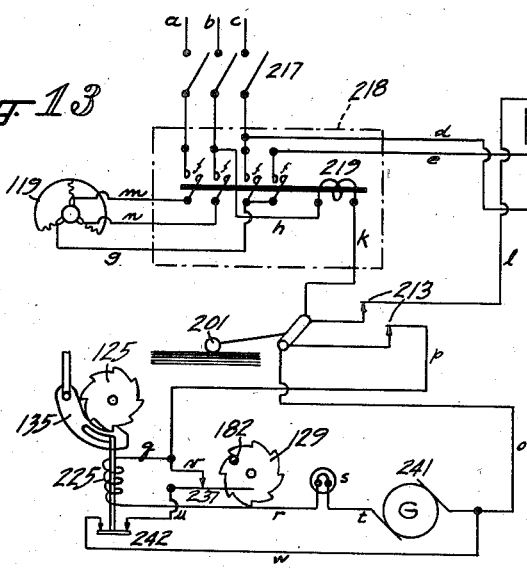
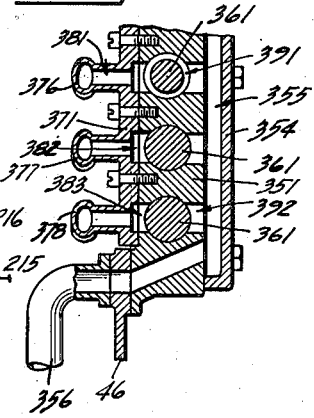
INVENTOR
Victor T. Grover
BY Ivan D. Thornburgh
Charles H. Cline
ATTORNEYS March 23, 1937. V. T. GROVER 2,074,330
SHEET HANDLING AND FEEDING APPARATUS
Filed Sept. 22, 1933 9 Sheets-Sheet 8
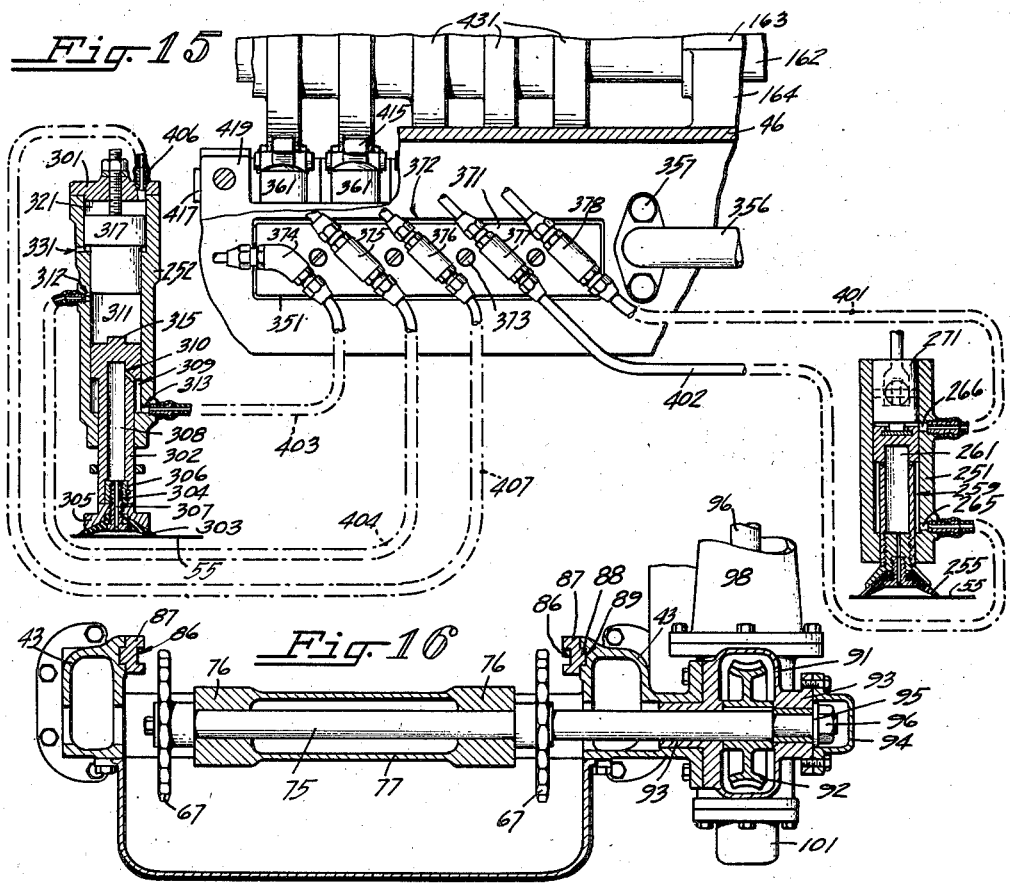
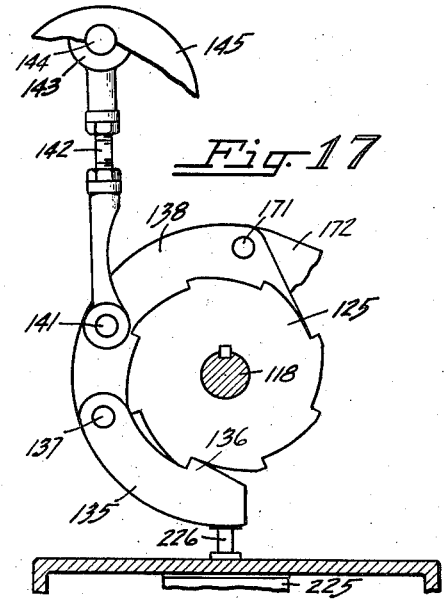
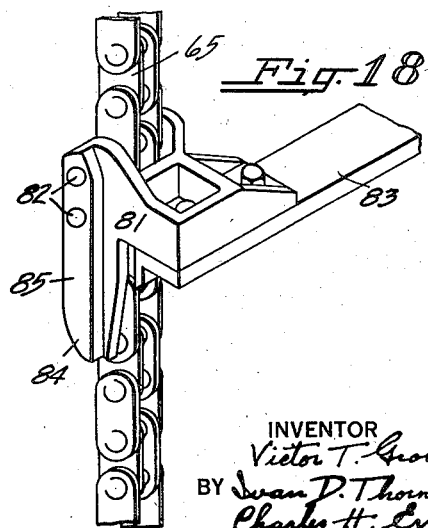
INVENTOR
Victor T. Grover
BY Ivan D. Thornburgh
Charles H. Erne
ATTORNEYS

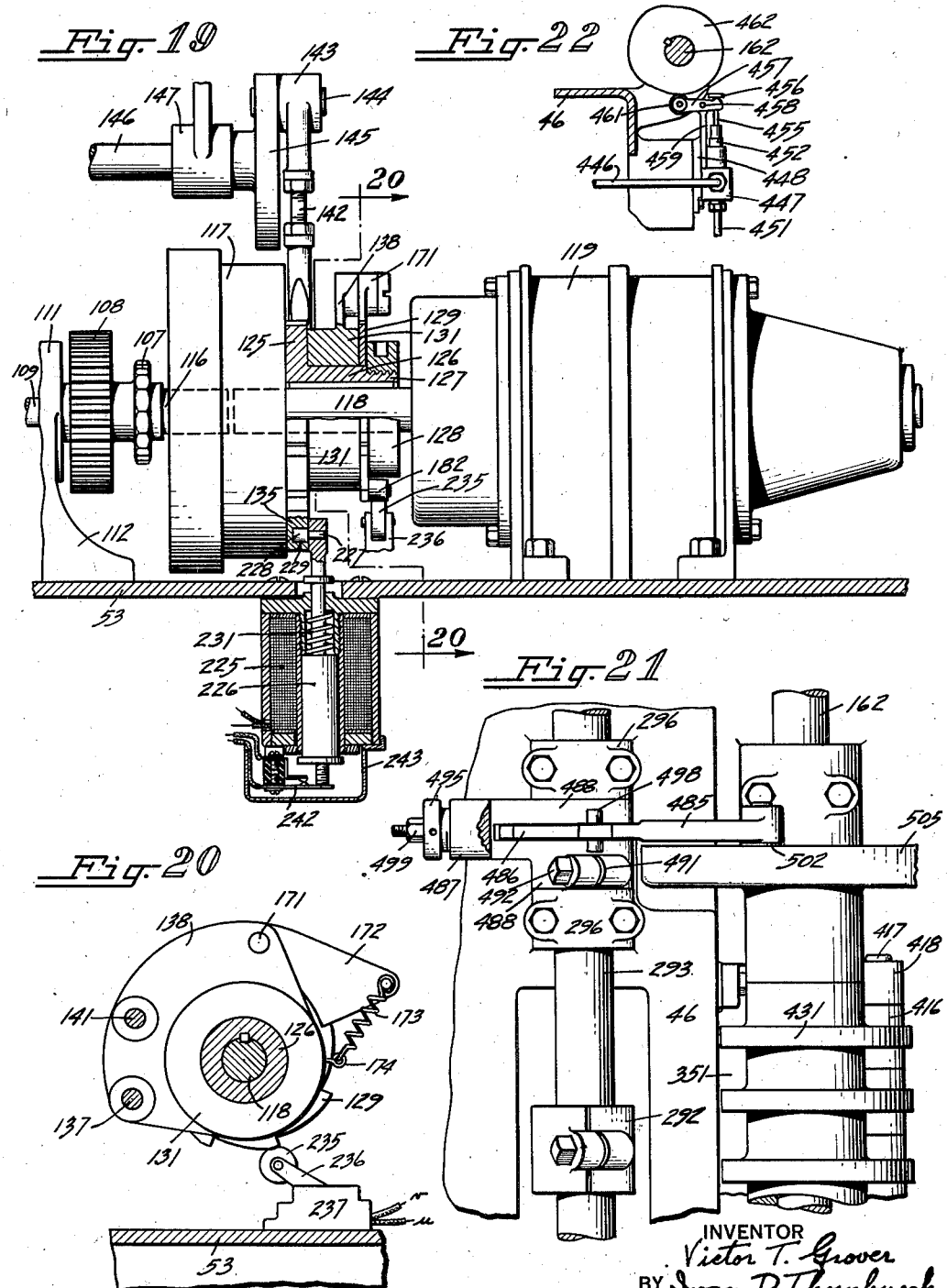

Patented Mar. 23, 1937

2,074,330

UNITED STATES PATENT OFFICE 2,074,330

SHEET HANDLING AND FEEDING APPARATUS

Victor T. Grover, Irvington, N. J., assignor to American Can Company, New York, N. Y., a corporation of New Jersey Application September 22, 1933, Serial No. 690,626

16 Claims. (Cl. 271—31)

The present invention relates to an apparatus for handling sheet material such as tin plate and the like, and has particular reference to apparatus for separating and feeding sheets from a stack which is placed in the machine and brought to feeding position, certain mechanism elevating the stack to present the top sheet to the separating devices and to maintain the top of the stack in feeding position, the operations being automatic and insuring proper feed while permitting insertion of other stacks of sheets to the end that time losses will be minimized.

The invention contemplates two different elevating functions for movement of the stack of sheets so that when a stack is first introduced into the machine, the elevator may be rapidly actuated to bring the top of the stack into its desired feeding position, following which the elevation of the stack automatically continues at a relatively slow rate to correspond with the sheet removal time.

The elevating control of the apparatus prevents elevation of a stack beyond a predetermined position regardless of whether the rapid or the slower elevating movement is being employed. After a stop of the elevator under such stop control, operation is again automatically resumed as soon as the top of the stack is sufficiently lowered, this being brought about by the removal of the fed sheets. This control furthermore insures against a constant starting and stopping at each feeding cycle by introducing a time element which slows down and evens the elevating action.

An object, therefore, of the invention is the provision of an apparatus for separating sheets in a stack and individually feeding them from off of the stack while maintaining the stack in proper feeding position.

A further object of the invention is the provision of suction devices for such an apparatus which individually engage and separate sheets from a stack and which also shake each sheet to further insure its full individual separation, the separated sheet then being fed laterally from the stack with the help of the suction devices.

The invention also contemplates the utilization of suction devices which are moved to perform the sheet engaging and separating functions by the same pneumatic means which creates the suction, this being automatically controlled to effect the desired coordinated steps in the handling of the sheets.

In the lateral removal and feeding of the sheet from its separated position at least some of the suction devices still hold the separated sheet and bodily move with it during its feeding, this insuring accurate control of the sheet at all times and until it is properly within the sphere of action of the feeding devices.

A further feature of the operation of the suction devices insures full and complete sheet engagement and where such engagement is defective the lateral removal of the separated sheet is withheld until the proper engagement is made.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a sheet handling and feeding apparatus embodying the present invention;

Fig. 2 is a longitudinal section partly broken away looking toward the front of the machine, being taken substantially along the section line 2—2 in Fig. 1;

Fig. 3 is a front elevation of the apparatus broken away on one side;

Fig. 4 is an enlarged sectional view taken substantially along the broken line 4—4 in Fig. 3;

Fig. 5 is a plan, sectional suction cup air valve detail taken substantially along the line 5—5 in Fig. 4;

Fig. 6 is a plan sectional view of the magnetic feeding rollers, being taken substantially along the line 6—6 in Fig. 4;

Fig. 10 is a side elevation partly in section of one of the feeding suction cup members as taken substantially along the line 10—10 in Fig. 3;

Fig. 11 is a sectional view of the magnetic rollers being taken substantially along the line 11—11 in Fig. 6;

Fig. 12 is an enlarged plan sectional detail taken substantially along the line 12—12 in Fig. 2;

Fig. 13 is a wiring diagram of the motor elevator circuit and the electric control circuit for the apparatus;

Fig. 14 is a plan sectional view through the suction cup air valves as viewed along the section line 14—14 in Fig. 4;

Fig. 15 is a sectional view of the suction cup air valves being taken substantially along the line 15—15 in Fig. 4;

Fig. 16 is a plan sectional view taken substantially along the line 16—16 in Fig. 1;

Fig. 17 is an enlarged sectional view of the elevator stop control as taken substantially along the line 17—17 in Fig. 3;

Fig. 18 is a fragmentary perspective view of a part of a conveyor chain and its stack supporting member;

Fig. 19 is an enlarged side elevation of the elevator drive shown partly in section and showing substantially the same parts as are illustrated in the lower central section of Fig. 3;

Fig. 20 is a sectional detail taken substantially along the broken line 20—20 in Fig. 19;

Fig. 21 is a plan view of one of the suction head shifting devices as viewed from along the broken line 21—21 in Fig. 8, parts being broken away; and Fig. 22 is a sectional detail taken substantially along the line 22—22 in Fig. 3.

General construction

Figure 7:
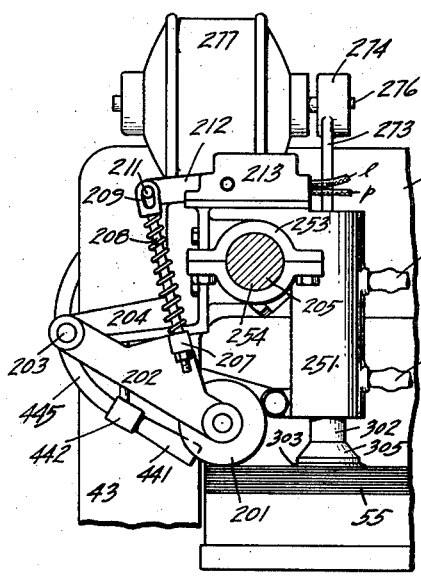
Fig. 7 is a side elevation partly in section of one of the vibration suction cups.

The apparatus disclosed in the drawings as a preferred embodiment of the present invention is mounted upon a base 41 (Figs. 1 and 2) which supports two spaced side frames 42. Each side frame is formed by upwardly extending hollow columns 43 which are connected adjacent their upper ends by a double walled connecting section 44. The columns 43 are connected adjacent their bottom ends by an angle iron 45 which ties the columns together adjacent their connections with the base 41 and provides supports for certain parts of the elevator mechanism.

The four vertical columns 43 of the two side members 42 are all connected together by a housing cover or casing 46 which ties the parts firmly together and provides a closed top for the two spaced side members. At the front part of the machine the forward columns 43 are further connected adjacent their middle sections by a connecting plate 51 (Fig. 3) which is secured by bolts 52 to the columns.

A shelf member 53 is also disposed on the front of the machine, this shelf extending across and between the forward columns at a position near the base 41, bolts 54 being used for this purpose. These members 51, 53 (Figs. 1 and 3) also assist in providing a rigid construction for certain operating parts of the machine.

Stack elevator

A stack elevator operates within the columns 43 and is adapted to receive sheets 55 (Figs. 2 and 4) which are stacked into a horizontal unit, this stack being supported on a skid of any suitable form which may comprise a horizontal table part 56 and transverse supports 57. Such form of skid is quite generally used in can manufacturing plants, the sheets of tin plate 55 being piled to a height of 12 or 14 inches.

In inserting a skid of stacked sheets into the apparatus, it is placed between the two side frames 42 being introduced through an open end and from the rear of the machine. The base 41 is formed centrally with vertically extending side plates 58, two of these extending up and in between the side frames 42, as best illustrated in Fig. 2. A supporting floor 61 of wood or other suitable material is first laid upon the top of the plates 58 and the skid of stacked tin plate is placed upon this floor and is then in position for elevation.

The elevator embodies a pair of elevating chains 65 (Figs. 1 and 2) located between the columns 43 of each side frame 42 and the chains operate over lower idler sprockets 66 and upper drive sprockets 67. Each sprocket 66 turns freely on a stub shaft 68 carried in a bracket 69 secured by bolts 71 to the side of the angle iron 45. Each bracket 69 may be slotted at 72 where the bolts 71 extend through the bracket wall for adjustment purposes, such adjustments providing for tightening of the elevator chains.

The two drive sprockets 67 on each side of the apparatus are secured to a drive shaft 75 (Figs. 1, 2, and 16) which is journaled in bearings 76 formed in a tubular sleeve section 77 joining the spaced walls of the connecting section 44 at its top.

Each of the chains 65 carries spaced blocks 81 (Figs. 1, 2, and 18), each block being secured to a link of the chain by pins 82 which pass through and form the pintles for the chain link. Two blocks 81 one of each chain are connected together by means of a bar 83 which extends across the space between the chains and ties the chains together at spaced intervals.

As the bars pass to the inside of the chain run and move upwardly a pointed nose 84 formed on one end of side strip extensions 85 of each block 81 passes into the lower end of a vertical groove 86 of a side strip 87 (Figs. 2, 12, and 16) which is formed with a tongue 88 which fits within a groove 89 cut in each column 43. The block side strip extensions 85 slide freely within the grooves 86 but fit sufficiently close to steady the chains 65 and the bars 83.

The connecting bar 83 on each side of the elevator space moves upwardly from the bottom of the chain run and engages an end of the flooring 61 of the skid 56, as best illustrated in Fig. 2. The two chains for each side of the apparatus move in unison so that both ends of the floor 61 are simultaneously engaged and this is then lifted together with its skid 56 and the superimposed stack of sheets 55. This constitutes the elevator for the stack of sheets previously referred to.

Elevator motor drive and rapid lift

The elevator for first raising the stack of sheets 55 into feeding position is preferably operated for quick movement at which time an electric motor is used and after coming into position the sheets are then slowly raised in a step by step movement by other means. The first or rapid lifting of the stack prevents unnecessary loss of time in bringing the stack of sheets into feeding position near the upper part of the apparatus and the second or step feeding is used to hold the top of the stack into the proper sheet feeding position. This first or rapid drive of the conveyor will first be considered in detail.

Each conveyor shaft 75 (Figs. 1, 3, and 16) is extended toward the front of the machine where it passes into a gear housing 91. This gear housing is bolted to the front column 43 of each side frame 42. A worm gear 92 is keyed to the end of each shaft 75 where it is confined within the housing and the shaft at this forward end is further journaled in bearings 93 formed in the housing. A cap 94 bolted on the outside of each housing at the end of the shaft confines the shaft 'end and also a washer 95 and a lock nut 96, the latter threadedly engaged on the end of the shaft. Washer and lock nut prevent longitudinal shifting of the shaft.

Each worm gear 92 meshes with a worm 95 and the two worms are secured to the ends of a horizontal shaft 96. The shaft 96 is journaled at its ends in bearings 97 formed in the gear housings 91 and in bearings formed in tubular shells 98 bolted at 99 to the inner faces of the two gear housings. A housing cover 101 is bolted to the outer side of each gear housing 91 and encloses the end of the shaft 96 on that side.

Figure 9:
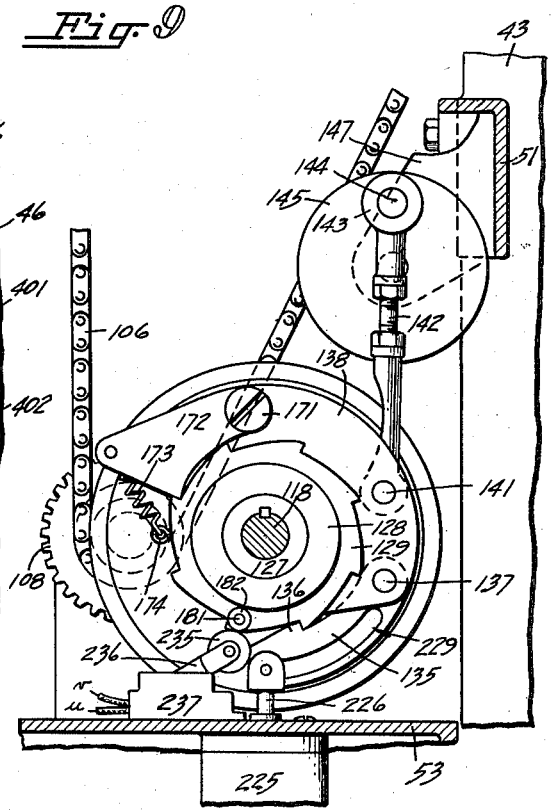
Fig. 9 is an enlarged sectional detail of the elevator ratchet feed as taken substantially along the line 9—9 in Fig. 3.

The shaft 96 carries a sprocket 105 (Figs. 1 and 3) over which operates a chain 106. Chain 106 also operates over a lower sprocket 107 (see also Figs. 9 and 19) which is preferably an integral part of a gear 108, the sprocket and gear turning loosely on a stud 109 held in a boss 111 of a bracket 112 mounted upon and supported by the shelf 53. A nut 113 threadedly engaging the end of the stud 109 holds it in fixed position.

The gear 108 (Fig. 1) meshes with a gear 115 which is secured to a gear reduction shaft 116 also journaled in the bracket 112 the end of the shaft extending into a gear reduction unit 117. The gear reduction unit also connects with and receives rotation from a motor shaft 118 (Figs. 3 and 19) of an electric motor 119 mounted upon and secured to the shelf 53.

This motor 119 is used to operate the elevator when it is raising a stack of sheets at the higher speed, the motor at such time being energized through an electric circuit which will be hereinafter more fully described. As long as the motor 116 is receiving its electrical energy, the shaft 118 is rotating and through the gear reduction 117 the shaft 116 is simultaneously rotated but at a slower speed.

By means of the gear and sprocket connections previously described, this rotation is transmitted to the shaft 96 as the higher speed of drive for elevating the gear reduction unit 116 merely cutting down from the motor speed at such time. The shaft 96 in turn, by means of the worm gearing 95, 92, operates the shafts 75 and the chains 65 to rapidly lift the skid 56 with its stack of sheets 55.

The need for this rapid raising of the sheets in the elevator ceases as soon as sheet feeding position is reached and the motor 119 is thereupon deenergized and its driving ceases. The parts are now driven by the slower, step movement mechanism which will now be described.

*Elevator ratchet drive and step by step lift*

The elevating chains 65 on this step by step operation are also driven through the motor shaft 118 but at such time the shaft is not rotated by the motor but is turned freely within the motor. For this purpose the motor shaft 118 between the motor and the gear reduction unit 117 carries a ratchet 125 (Figs. 3, 17, and 19) which on one side is against one face of the gear reduction unit and on the opposite side extends into a sleeve 126.

The sleeve 126 terminates in a threaded reduced end 127 on which is threadedly mounted a collar 128. This collar confines a second ratchet disc 129 and a sleeve 131 between it and the face of the ratchet 125. The ratchet disc 129 and sleeve 131 are both loosely mounted on the sleeve 126 of the ratchet and at some times slide relative to the sleeve 126.

The ratchet 125 is moved in a step by step movement during the slow feeding of the elevating conveyors by means of a dog 135 (Fig. 17) having a toothed projection 136 which engages in one of the teeth of the ratchet. The dog 135 is pivotally mounted on a pin 137 which is carried in a flanged wall 138 (Figs. 17 and 20) extending outwardly from the sleeve 131.

The flange 138 also carries a pin 141 which provides a pivotal connection for an adjustable connecting rod unit 142, the upper end of which is formed with a head 143 (Figs. 3, 9, and 19) which extends over a crank pin 144 projecting outwardly from the face of a crank disc 145. The crank disc 145 is secured to one end of a horizontal shaft 146 which is journaled in bearings 147 formed in the frame plate 51.

The opposite end of the shaft 146 carries a sprocket 151 (see also Fig. 1) which is located at one side of the machine. A chain 152 operates over the sprocket 151 and also over an idler sprocket 153 loosely mounted on a stud 154 carried in the end of a bracket 155. The bracket 155 is mounted upon and secured to one of the gear housings 91. The chain 152 also passes over a sprocket 156 which is secured to a shaft 157 also journaled in the bracket 155.

The chain 152 also passes over and is driven by a sprocket 161 which is secured to one end of a horizontal drive shaft 162 located near the top of the apparatus. Shaft 162 is journaled in bearings 163 formed in upwardly extending projections 164 of the cover casing 46. The drive shaft 162 is continuously rotated in any suitable manner as by the application of power to a drive pulley 165 secured to the opposite end of the shaft and this rotation continues as long as the machine is operating.

When the elevating chains are being operated at the rapid lifting speed by means of the motor 119 as previously described the drive shaft 162 continues to operate the crank 145 and through the crank connection described continues to oscillate the sleeve 131. The motor shaft 118 at such time, however, is turning at a much greater speed of rotation than the sleeve and the teeth of the ratchet 125 snap by the teeth 136 of the dog 135.

The flange 138 of the sleeve 131 also carries a stud 171 (Figs. 9, 19, and 20) on which a spring dog 172 is pivotally mounted. This dog is held in engagement with the teeth of the ratchet 129 by a spring 173 which is interposed between the free end of the dog and a screw eye 174 threadedly engaging the sleeve 131.

Each shifting of the sleeve 131 in one direction (counterclockwise, Fig. 9) moves the ratchet disc 129 the distance of a tooth and in the other direction the dog 172 slips back over and engages the next adjacent tooth of the ratchet disc. Since the disc 129 is disclosed with eight teeth, eight oscillations of the sleeve 131 will carry the ratchet disc 129 through one complete rotation on the sleeve.

The ratchet disc 129 carries a pin 181 which loosely supports a roller 182 adapted to operate a switch associated with the stopping of the elevator. The electric circuit in which this switch is embodied is also associated with a second switch that in its turn is operated when the top of a stack of sheets has reached a predetermined position. This will now be described in detail.

*Elevator stop switch and electric controls*

When the top of a stack of sheets within the elevator reaches the predetermined position referred to, the uppermost sheet engages and raises a roller 201 (Figs. 1 and 7) rotatably mounted on an arm 202 pivotally secured at 203 to a bracket 204 secured to and carried by a horizontal stationary supporting shaft 205 carried in the frame of the machine. This stationary shaft extends across the machine at its rear end and is carried in the cover casing 46, being held in bearings 206.

The arm 202 is formed with a boss 207 with which a rod 208 is associated, the upper end of the rod being formed with a slotted head 209 which engages a pin 211 carried in an arm 212 of an electric switch 213. This switch 213 together with the switch operated by the roller 181 on the ratchet disc 129 is used to stop lifting of the sheets by the elevator. Such control is effective during the time the motor 119 is raising the sheet stack rapidly and also during the time the step by step feeding of the sheets is being carried out by operation of the drive shaft 162 through the ratchet device described in the last section.

Reference should now be had to Fig. 13 which illustrates in diagram an electric circuit in which the two switches are embodied. When the top of the stack of sheets first engages the roller 201 but before it is lifted, this being graphically indicated in the wiring diagram, the switch 213 closes an electric circuit directly associated with the motor 119 and when so closed permits lifting of the stack through the conveyors at the rapid rate. With switch 213 in this position the motor 119 is started for the rapid lifting of the sheets by the pressure of a starting button 215. The starting button is contained in a suitable switch box and a stop button 216 is also contained in the same box. The current passes through the motor circuit when the starting button is operated.

The electric motor 119 is preferably connected in a three-phase electrical system comprising lead wires $a$, $b$ and $c$ which preferably pass through a suitable service switch 217 and thence into a switch box designated by the dot and dash lines and marked 218. This switch box may also contain the start and stop buttons 215, 216 previously referred to. In the diagram of Fig. 13 these buttons are indicated diagrammatically as outside of the outlines of the switch box, this arrangement making the diagram less complicated.

A wire $d$ leads from one side of the starting button switch 215 and connects with the wire $c$ the opposite side of the switch being connected by a wire $e$ to an automatic four-contact switch $f$ one point of which is joined by a wire $g$ to the motor 119.

An electro-magnet 219 is carried in the switch box 218 and is associated by a movable solenoid core or similar device with the switch embodying the contact points $f$. This switch is a spring back or normally opened switch. The magnet is joined by a wire $h$ to the wire $b$ and by a wire $k$ leading from the switch 213. A return wire $l$ leads from the opposite side of the switch 213 to one side of the stop button switch 216.

When the start button 215 is moved to close the circuit through the motor 119 a momentary starting current flows from the wire $c$, wire $d$ through the starting and stop switches 215, 216, wire $l$, switch 213, wire $k$ and into the electromagnet 219 and wire $h$ back to the lead line $b$. This energizes the electro-magnet 219 and closes the automatic switch at contacts $f$, leading the current into the electric motor 119.

The current thereupon passes through wire $c$ and wire $g$ and through wires $a$, $b$ and through wires $m$, $n$ leading respectively from the wires $a$, $b$ and such a current excites the fields of the motor and causes its actuation. As soon as the automatic switch closes at the contact points $f$ a new circuit is established and current follows the same path as the starting current only now it passes along the wire $e$ and thence back to $c$.

The start button 215 is not included in this holding circuit and its immediate release by the operator in no way affects the continued operation of the motor. As long as the current flows in this manner the motor operates and the conveyor raises the stack of sheets at the rapid lifting rate. This continues until the current is broken at switch 213 which takes place when the top of the stack of sheets lifts the switch roller 201.

The starting circuit and the holding circuit for the motor 119 which has just been described, is not used in any way for automatically stopping the elevators when they are being raised slowly through connection with the drive shaft 162 but the same switch 213 is used at such a time for opening another independent control circuit associated with the ratchet 125 and the ratchet disc 129, this circuit being also disclosed in diagram in Fig. 13.

The actuation of the elevator in its step movement and through the ratchet 125 takes place only when the dog 135 is in engagement with the tooth 136 of the ratchet during movement of the sleeve 131 on its feeding stroke. Engagement between ratchet and dog is brought about by the energizing of a solenoid 225 (shown in detail in Fig. 19) which is suspended from the shelf 53 directly beneath the ratchet 125.

A core 226 of the solenoid 225 extends upwardly through an opening in the shelf and carries a pin 227 on which a roller 228 is rotatably mounted. This roller extends within an arcuate groove or slot 229 (see also Fig. 9) formed in one face of the dog 135. As long as the solenoid 225 is energized its core 226 is held in raised position and the end of the dog 135 engages the periphery of the ratchet 125, this being the position of Figs. 9 and 17.

On the other hand, if the solenoid 225 is deenergized a spring 231 (Fig. 19) contained within the solenoid and bearing against the enlarged lower end of its core 226, forces the core into lowered position and pulls out the dog 135 from its engagement with the ratchet.

Whether or not the solenoid 225 is energized depends in turn upon the position of the roller 182 carried by the ratchet disc 129. As disclosed in Fig. 9 this roller 182 in one position engages a roller 235 carried on an arm 236 of a switch 237 which is mounted on the shelf 53 beneath the ratchet disc 129, this being adjacent the solenoid 225. The action of the solenoid and the switch 237 will now be explained in connection with the wiring diagram of Fig. 13.

With the switch 213 closed current for the control circuit flows from any suitable source of supply such as a generator 241 through a wire $o$, through the closed switch 213 and wire $p$ and a wire $q$, the coil of the solenoid 225 and thence by a wire $r$ through a lamp $s$ and wire $t$ back to the other side of the generator 241. This energizes the solenoid 225 and raises its core 226 and moves the dog 135 into feeding position. This movement is against the action of the solenoid spring 231.

As soon as the core 226 moves into this raised position, a second circuit is closed through a switch 242 contained within the bottom of the solenoid 225. Figure 19 shows this switch in detail, it being enclosed within a cover plate 243 affixed to the solenoid. The lower end of the core 226 projects down and engages one of the contact points of the switch when the core is in lowered position and at such time the circuit in the switch 242 is broken. The contact points of this switch, however, normally spring into closed position when the solenoid core 226 is raised.

One side of the switch 237 is electrically connected with the switch 242 by a wire *u* and the opposite side is connected by a wire *v* with the wire *p* at its junction with the wire *q*. The opposite side of switch 242 is connected by a wire *w* with the wire *o*. Such an arrangement operates as follows.

When the roller 182 is out of engagement with the switch roller 235 of the switch 237 the latter is closed through its wires *u*, *v* and as soon as the switch 242 is closed a secondary circuit flows from the wire *o*, switch 242, wire *u*, switch 237, wire *v*, wire *q* through the winding of the solenoid 225, and wires *r* and *t* back to the opposite side of the generator 241.

Current flowing in this circuit also energizes the solenoid 225 which will maintain the engaged position of dog 135 and ratchet 125 even though the switch 213 is opened and the current interrupted through the wires *o*, *p*. The step actuation of the elevator therefore continues with switch 213 open and with the stack of sheets in high position until the roller 182 engages the roller 235 of the switch 237. At that time the current is interrupted and step lifting of the stack of sheets ceases.

The effect of this combination of circuits is to prevent a stop of the lifting action of the elevator merely when the top of the stack opens the switch 213 by engagement with the roller 201 of the switch except at such time as the switch 237 is also opened. This means in an extreme case where the roller 182 has just passed by the switch roller 235 that the elevator will continue to operate in its step movement, even though the top of the stack opens the switch 213, until the ratchet disc 129 is moved through its seven remaining step positions.

Opening of the switch 237 at the end of that time, however, (the switch 213 remaining open) will disengage dog 135 and ratchet 125 and thus stop the elevator. It will be observed that a high stack position immediately stops rapid elevation but step elevation may be delayed.

*Sheet separation suction cups*

When the top of the stack of sheets 55 is about touching or is in engagement with the switch roller 201, the top sheet of the stack is in position for engagement by the suction devices. These suction devices comprise two rear suction heads 251 and two front suction heads 252 (Figs. 1, 3, 4, and 15). The two rear heads are supported on the stationary shaft 205 (see also Fig. 7), each head body having an extension 253 which rests on top of the shaft 205 and which is held in clamped position by a clamping plate 254 secured by bolts to the part 253. This holds the two suction heads 251 in a vertical and in a stationary position.

Each head 251 is formed as a vertically extending tubular body or cylinder and the sheet engaging part of the suction device has vertical movement within the cylinder. Each movable rear suction device is provided with a suction rubber or suction cup 255 which is held in the bottom end of a movable block 256, a screw 257 having a flat head being threadedly engaged in the block for this purpose.

The movable block 256 is threadedly engaged in the lower end of a piston 258, the upper end of which slidably fits within the cylinder suction head 251. The lower part of the piston is smaller in diameter and this feature provides a chamber 259 between the inside wall of the cylinder and the exterior wall of the piston. Piston 258 is formed with a hollow central chamber 261 and the block 256 and screw 257 are both centrally apertured to provide communication between the chamber 261 and the inside of the suction rubber 255.

The chambers 259, 261 are joined by radial ports 264 which are utilized in the removal of air from within the suction cup 255 when it has engaged the top sheet 55 in the stack. A port 265 cut radially through the suction head body 251 and opening into the chamber 259 allows for removal of the air from the chamber as will be hereinafter more fully described.

The piston 258 of each rear suction head is adapted to move downwardly from the raised position of Figs. 4 and 15 into the position of Figs. 1 and 7, and this movement is effected by the use of vacuum. The suction head body 251 is provided with a second radial port 266 located in alignment and above the port 265 and the combined use of atmospheric pressure and vacuum is made in connection with the passageways 265, 266 for such piston movement. A detailed description of this feature will be reserved for subsequent explanation in connection with the suction control valves.

The two rear suction cups 255 coming down and engaging the top sheet in the stack lift the rear edge of the sheet as they again move upwardly. In a similar manner the sheet's front edge is moved upwardly by means of suction cups associated with the front suction heads 252, as will be hereinafter described in detail.

The two rear suction devices embodying vibrating features by means of which the rear edge of the engaged top sheet is vigorously shaken after it has been lifted clear of the stack, this vibrating action tending to shake loose and separate any adhering sheets. A separate vibrating unit is associated with each rear suction head for this purpose.

The upper end of the cylinder head 251 is closed by a second piston 271 (Figs. 4 and 15) which also has sliding airtight fit within the cylinder, this piston also being hollow and open at its top. A transfer pin 272 extends diametrically across this opening and provides a pivotal support for the lower end of an arm 273 which is formed at its upper end with an eccentric strap form of head 274 mounted on an eccentric collar 275 carried on a motor shaft 276 of a small electric motor 277. Each motor 277 is supported on the stationary shaft 205 being mounted upon a bracket 278 which rests on and is held in fixed stationary position by a clamp 279 bolted to the bracket.

Continual rotation of the motor 277 acting through the eccentric collar 275 and arm 273 causes its associated piston 271 to move up and down through a small distance but at a very rapid rate. When the piston 258 is in the upper position within the cylinder a disc 281 carried in the top of this piston holds against the lower end of the piston 271 and the rapid movement of the latter is communicated as hammer blows to the suction rubber 255. The shaking loose of any adhering sheets is further assisted by an air blast directed against the sheet edges, as will be hereinafter more fully described.

Each front suction head 252 is bolted to and carried on a projecting part 291 (Figs. 4 and 10) of an arm 292. This is near the lower end of the arm (see also Fig. 2) and its upper end is keyed to a rock shaft 293 mounted on top of the apparatus and positioned adjacent and parallel to the drive shaft 162. Each arm 292 is also formed with a split section 294 where it is closed around the shaft and is held in its fixed position by a bolt 295. The rock shaft 293 is journaled in bearings 296 (Figs. 1 and 2) projecting upwardly from the cover casing 46.

Each suction head 252 like the rear head 251 is formed as a hollow cylinder which is closed at the top by a plate 301 (Figs. 4 and 15). The lower end of this cylinder carries a hollow piston 302. This piston at its lower end carries a suction rubber or cup 303 which is secured by a threaded screw 304 to a cup head 305 which is held by the same screw to a plug 306 pinned in the lower end of the piston 302.

The screw 304 is centrally apertured at 307 which provides an opening between the inside of the suction cup and a chamber 308 inside of the hollow piston 302. The upper end of the piston 302 is enlarged and slidingly fits within the cylinder head 252, its smaller lower end leaving a space between the piston wall and the cylinder wall as a chamber 309. A small port 310 provides a connection between the chambers 308, 309.

A chamber 311 is formed in the space above the piston 302 and connects with a radial bore 312 cut through the wall of the head 252 to provide one connection with the vacuum and air valve which will be hereinafter more fully described. A similar radial bore 313 is also cut through the cylinder wall and communicates with the chamber 309 and this is a second connection with the vacuum and air valve.

The lifting of the forward end of the top sheet 55 by the two suction cups 303 is done while the suction heads 252 remain in vertical position (Fig. 4). The piston 302 moves up into the chamber 311 until a button 315 formed on its top end strikes against a cushion disc 316 carried in the lower end of an upper piston 317 located in the upper end of the suction head cylinder. The piston 317 at such time is in the position illustrated in Fig. 4.

The piston 317 is hollow and is enlarged at its upper end to fit within a chamber 321 in the suction head 252 just beneath the cap 301. The upper end of the piston is internally threaded to receive a disc 322 which forms a top for the piston. The hollow space in the piston 317 provides a central chamber 323 and a plug 324 is located in the chamber. The plug is of slightly smaller diameter than the diameter of the chamber and is less in height than the height of the chamber.

Plug 324 is carried on the lower end of an adjusting screw 325 which extends loosely through an opening in the disc 322 and which is threadedly secured in the cover 301. Turning of this screw within the cover adjusts the vertical position of the plug 324 and when adjusted the same is held in fixed position by a lock nut 326 threadedly engaging the upper end of the screw. A packing washer 327 is clamped between the lock nut 326 and the top of the cover 301 and makes an airtight joint around the thread.

When the piston 302 is in its lowered or sheet engaging position the upper piston 317 is held suspended from the screw 325, the disc 322 resting on the upper end of the plug. When the piston 302 moves up with the sheet and its upper button end 315 strikes against the seat 316 the impact is sufficient to raise the piston 317 until the bottom wall of the chamber 323 strikes against the bottom of the plug 324.

This slight movement acts as a buffer for the rapidly moving piston 302 and permits a quicker movement of piston without an excessive shock. An air port 331 cut through the cylinder wall of the suction head directly below the enlarged part of the piston 317 allows for a restricted escape of air from below the head of the piston and lets it return to lowered position gently and without striking.

With the sheet held in raised position by the rear suction cups 255 and the front suction cups 303, it is in position to be moved forward or laterally of the stack. Before considering such a movement, however, the valve controlling the operation of the pistons 258, 302 for the suction cups 255, 303 will be considered.

*The suction cup valves*

Each rear suction device is controlled by two connections with the suction valve whereas each forward suction device utilizes three valve connections. This valve comprises a valve body or cylinder block 351 (Figs. 4, 5, 14, and 15) which is bolted to the cover frame 46. This valve body is provided with five vertically disposed cylindrical bores 352 each of which provides a chamber for an independent valve. Each chamber 352 at its bottom end is closed by a plug 353 inserted into and secured to the valve body 351.

An air manifold 354 is bolted on the front side of the valve body and provides a chamber 355 which extends along one side of the five vertical chambers 352. The manifold chamber 355 at one end connects with a vacuum supply pipe 356 which is bolted at 357 to a wall of the cover frame 46. This supply pipe 356 may connect with a vacuum pump or vacuum tank or any suitable vacuum producing element whereby the chamber 355 is exhausted of air and maintained as a vacuum chamber throughout the operation of the apparatus.

A valve 361 acts as a piston in each chamber 352, having an airtight sliding fit therein. Each valve is recessed at its bottom end at 362 and each plug 353 is similarly recessed at 363, the two recesses being in vertical alignment. A spring 364 is located in each chamber 352, its ends extending into the recesses 362, 363 and normally holding its associated valve 361 in raised position, this position being disclosed in Fig. 4.

The valve body 351 on the side opposite to the manifold 354 is recessed to provide an airtight seat for a valve plate 371 (Figs. 4, 14, and 15) which projects rearwardly and extends into an opening 372 cut through the wall of the cover 46. This plate 371 is secured to the valve body by screws 373 and is provided with five hollow projections 374, 375, 376, 377, and 378 which extend out through the opening 372. Each of these projections encloses a chamber 381.

A chamber 382 is formed in the plate 371 at the base of each chamber 381 and two small air passages 383, 384 are cut through the wall of the valve body to provide communication between each chamber 382 and the interior of the cylinder block containing the valve 361.

Each chamber 381 is adapted to be selectively brought into communication with the vacuum chamber 355 or with the outside atmosphere. This bringing of each chamber under vacuumizing or atmospheric conditions is dependent entirely upon the position of its valve 361. When a valve 361 is in raised position (Fig. 4) its chamber connects with the source of vacuum, when lowered, with atmosphere.

Each valve 361 is formed with an annular groove 391. When the valve is in raised position this annular groove provides a connection between the port 383 and a second port 392 is cut through the wall of the valve body 351 directly opposite. At such a time air is withdrawn from the chambers 381, 382 through the port 383, annular groove 391, port 392 and vacuum chamber 355 and out through the vacuum pipe 356.

When the valve is depressed or in its lower position its annular groove 391 is in register with the lower port 384 of the chamber 382 and with a second port 393 cut through the front wall of the valve body 351 directly below the manifold 354 and opposite to the port 384. In this position air passes into the port 393, valve groove 391, port 384, chamber 382 and into the chamber 381. Each chamber 381 communicates with one or the other of the suction devices 251, 252 and the connecting ports or chambers accordingly are either on vacuum or atmosphere according to the condition of its valve chamber 381.

As best illustrated in Fig. 15 the two rear suction devices 251 connect on one side or the other, that is, on the top or bottom of the hollow projections 377, 378. The particular suction heads 251 and 252 shown connect on the bottom of the projections and the two suction heads not shown connect on top. The port 266 formed in the suction head 251 is connected by a pipe 401 with the hollow projection 378 and the port 265 is similarly connected by a pipe 402 with the hollow projection 377.

In like manner the front suction heads 252 are connected with the hollow projections 374, 375, and 376. Each port 313 is connected by a pipe 403 with the projection 374 and the port 312 is connected by a pipe 404 to the projection 375. A third port 406 is cut through the cap 301 and communicates with the chamber 321 and this port is connected by a pipe 407 with the projection 376.

The operation and timing of the suction devices 251, 252 will be considered in detail, it being only necessary to operate the valve 361 associated with the desired chamber 381 to supply the particular suction with atmosphere or with vacuum, according to the work to be performed. Prior to this detailed consideration, however, the mechanical operation of the valves 361 will be considered.

Each valve spring 364 holds its valve 361 in raised position where its associated suction head is on vacuum and such valve is depressed to cut off the vacuum connection and bring about atmospheric conditions by a cam controlled arm 415 (Figs. 3, 4, 5, and 15). Each arm is centrally bifurcated and its sides at one end merge into a boss 416 which is loosely mounted on a horizontal stationary shaft 417 held in bearings 418 of a pair of projections 419 extending forward from the valve body 351.

The free or opposite end of the arm 415 engages the top of the valve 361 and when the latter is in its raised position a tail 425 formed in each boss 416 strikes against a tie rod 426 extending between and carried in projections 419. This limits the action of the valve spring 364. A cam roller 427 (Figs. 3, 4, and 5) is rotatably mounted on a pin 428 which holds its roller between the walls of the arm 415, the pin 428 being supported in these arms.

Each valve is independently controlled by a cam 431 which is located on and keyed to the drive shaft 162, the five cams being located alongside. A cam acting on the roller 427 rocks the arm 415 on the shaft 417 and pushes the valve 361 downwardly against the action of its spring 364 to bring the annular valve groove 391 in register with the ports 384, 393 and establish atmospheric conditions in the connecting pipe line, as previously described.

The rear suction cups 255 first engage the sheet to be fed and to obtain this action the upper ports 266 of the suction heads 251 are opened to atmosphere by the depression of the valve 361 (Fig. 4) associated with the valve projection 378 (Fig. 15). Air thereupon flows into the port 393 through the annular valve groove 391, port 384, chambers 382, 381, pipe 401, port 266 into the upper end of the chamber containing the piston 258, this being above the top of the piston.

Gravity drops the pistons 258 but at the same time vacuum is effected through the valve projection 377 and this assists gravity in lowering the cups 255. Air is drawn out of each chamber 259 in each valve body 251 through the port 265, pipe 402, chambers 381, 382, port 383, annular valve groove 391, port 392, vacuum chamber 355 and thence out through the vacuum pipe 356.

The piston descent is rapid under the atmospheric pressure exerted on its upper end and the suction rubber 255 is brought firmly into engagement with the uppermost sheet 55 in the stack. The edges of the suction rubber seal on the sheet and air is quickly drawn out from the space within the rubber and over the surface of the sheet. This creates a suction hold between rubbers and sheet so that the latter can be safely raised with the lifting of the piston 258.

Piston 258 is immediately raised, this being accomplished by removal of air from the upper end of the piston while the suction still obtains in the center of the piston. Raising of the depressed valve 361 of the valve extension 378 changes the interior of the cylinder heads 251 from atmosphere to vacuum and air passes out from the top of the piston 258 through the port 266, pipe 401, etc., back to the vacuum line 356. With vacuum on the top part of the piston as well as in the chambers 259, 261 the atmospheric pressure exerting itself from under the held sheet forces the two pistons 258 upwardly, thus lifting the sheet at its rear end into the position illustrated in Fig. 4.

In a similar way the two forward suction heads are conditioned by means of their valves 361 so that the piston 302 of each is lowered to bring its suction rubber 303 into engagement with the front part of the top sheet on the stack. This is done in the following manner.

Air is drawn out of the chamber 309 (Figs. 4 and 15) of each suction head 252 through their ports 313, pipes 403 and chambers 381, 382 of the extension member 374 and thence out through the port 383, the annular valve groove 391, port 392 and vacuum chamber 355. Air also passes from the piston chamber 308 by way of the port 310.

At the same time the chamber 311 at the top of the piston 302 is opened to atmosphere by proper depression of its valve 361, air passing through the port 393, around the valve groove 391, port 384, chambers 382, 381 of the valve extension 375, thence into the pipe 404 and through the port 312 to the chamber 311.

The weight of the piston assisted by atmospheric pressure from above, and with the chamber 309 vacuumized from below carries the piston down and brings its rubber 303 into sheet engagement. As soon as the edges of suction rubbers 303 have sealed against the sheet the space beneath the rubbers and above the engaged part of the sheet is vacuumized as was previously done with the rear suction cups 255. Air in this space now passes out through the port 307 in the screws 304, out of the chamber 308 through the port 310 into the chamber 309, and thence out into the vacuum line. This action holds the sheet against the rubbers and permits lifting with the raising of the two pistons 302.

To effect the lifting of the piston 302 the valve 361 associated with the valve extension 375 is shifted from its atmosphere setting and the chamber 311 is vacuumized. With air removed from the top of the piston and with its inside chamber vacuumized, the atmospheric pressure exerting itself from the under surface of the engaged sheet raises the pistons 302, rubbers 303 and the front edge of the sheet. This lifting of the pistons 302 may take place about the same time as the lifting of the pistons 258 or it may be at a different time as desired.

The air blasts associated with the rear suction heads previously referred to will now be considered. Figs. 3, 4, and 22 disclose the nozzle, pipes, etc., used for this purpose. The air is controlled by a valve so that it is only delivered as used and under pressure and as a relatively strong blast. The air is turned on as soon as the sheet reaches its raised position. A discharge nozzle 441 (Fig. 4) is supported in a holder 442 adjustably carried on an arm 443 bolted at 444 to each suction body 251.

Each nozzle 441 is connected by a pipe 445 to a pipe 446 one end of which leads into a valve body 447 (Figs. 3, 4, and 22) carried in a bracket 448 bolted to a wall of the cover frame 46. This valve body 447 is also connected with a source of compressed air supply through a pipe 451.

Compressed air is brought to the pipe 451 at all times and a sliding valve 452 located in the valve body controls connection through the valve between the pipes 446, 451. When the valve 452 is depressed communication between the pipe 446 and the source of compressed air in the pipe 451 is cut-off and it is only when the valve 452 is raised that compressed air is permitted to enter through the pipe 446 and to be delivered into the nozzles 441.

The valve 452 is raised in proper time to effect this discharge of air through the nozzles by means of a cam carried on the drive shaft 162. The valve 452 carries a valve stem 455 formed with a head 456. A lever 457 is pivotally mounted at 458 to an extension 459 of the bracket 448 and one end of the lever engages beneath the head 457 of the valve stem. The opposite end of the lever carries a cam roller 461 which rides against the periphery of a cam 462 mounted on the drive shaft 162. This cam is so formed as to depress the roller 461 and rock the lever 457 to lift the valve 452, at which time the desired air blast is delivered through the nozzles.

*Suction cups sheet feed*

The sheet 55 which has just been lifted and separated from the stack of sheets is ready for transfer laterally from its position over the stack. This is accomplished by a swinging of the forward suction heads 252 while the sheet is still held on its suction rubbers 303. Before such swinging or lateral shifting of the front suction devices takes place the front end of the sheet is still further lifted to actuate and unhook a latch device which holds the suction heads 252.

The unlatching lift of the pistons 302 (Figs. 4 and 15) is effected through a lifting of the upper pistons 317 and these in turn are controlled by vacuumization of the upper chambers 321 through the valve in the valve extension 376. The vacuum is still held on the chambers 308, 309, 311, as each chamber 321 is vacuumized. Air from this chamber passes through the port 406, pipe 407 and chambers 381, 382 of the valve extension 376 and thence into the vacuum chamber 355.

As soon as air has been exhausted from the top of each of the pistons 317 the later move upwardly, atmosphere at such time passing through the radial port 331 of each to a lower surface of the piston and the air under the engaged sheet also assists and the piston 302 is correspondingly raised. The plug 324 limits this upward movement, the bottom wall of the piston 317 striking against the bottom of the plug. This is only a slight movement but is enough for the unlatching action.

Figure 8:
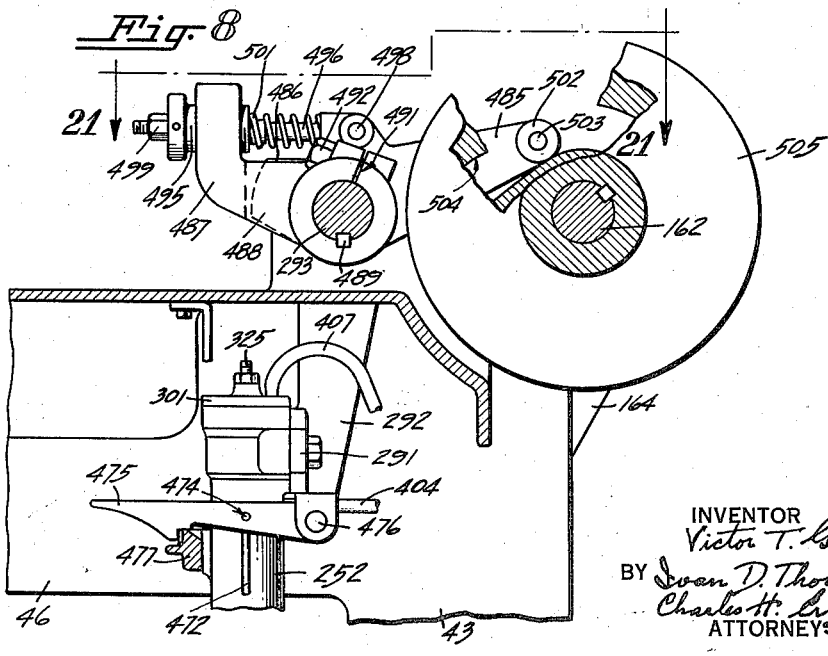
Fig. 8 is an enlarged transverse sectional detail taken substantially along the line 8—8 in Fig. 3.

During this short lifting movement of each piston 302 its sucker head 305 has been brought into engagement with two arms of a yoke 471 (Figs. 3, 4, and 10) which partially surrounds each piston 302 and is secured to the bottom end of a sliding rod 472. This rod moves through a lug 473 projecting outwardly from the cylinder body 252 of each front suction device and its upper end is pivotally connected at 474 (see also Fig. 8) to a latch 475. The latches hold the front suction devices in vertical fixed position during the time their suction heads are engaging a sheet.

Each latch 475 is pivotally connected at 476 to the lower end of each arm 292 and each latch when in latched position engages a stationary bar 477 which extends across the front of the machine, its ends being secured to the housing cover 46. Both of the front suction heads 252 must be unlatched from this bar 477 before the rock shaft 293 supporting the arms can be moved and this provision insures against shifting the sheet unless both of the suction rubbers 303 are fully engaged.

If only one rubber holds them the latch 475 associated with the other suction head is not lifted sufficiently to disengage the bar 477 as the piston 302 will not raise if air passes into the suction cups and no swinging movement of the suction heads is possible. In the event, however, that both suction rubbers 303 properly engage the front of the sheet and both pistons 302 are raised the extra distance to lift the yokes 471, both latch members 475 are disengaged and the arms 292 are free to move as soon as rocking movement is applied to the rock shaft 293. This rocking of the shaft will now be described.

The rock shaft 293 adjacent its center carries an arm 485 (Figs. 3, 8, and 21) which is loosely mounted on the shaft. This arm is extended at its rear in a tail section 486 which acts as a guide for the arm in its movement over or with the shaft 293. When either or both of the front suction head arms 292 are held against movement, the arm 485 moves loosely over the shaft 293, but when both of the latch members 475 are disconnected from the bar 477 this arm moves with the shaft.

This is made possible by the use of a block 487 which is split into two side sections 488 that extend along each side of the tail part 486 of the arm 485. Each side section is mounted on the shaft 293 and one or both are keyed to the shaft as at 489. One of the side sections is split at 491 and a bolt 492 is threadedly secured in the section and spans the slit 491 clamping the block 487 securely on the shaft.

The block 487 extends upwardly and is apertured for the reception of a threaded bushing 495 in which a bolt 496 is slidably disposed. The bolt 496 is pivotally connected at 498 to the arm 485 and its end outside of the bushing is threaded to receive a nut 499. A spring 501 surrounds the bolt 496 and is interposed between the inner end of the bushing 495 and a head section of the bolt.

The arm 485 carries a roller 502 which is rotatably mounted on a pin 503 carried on the free end of the arm. This roller operates in a cam groove 504 formed in a face cam 505 (Figs. 3, 8, and 21) keyed to the drive shaft 162. For each cycle of operation, that is, for one complete revolution of the drive shaft 162 the arm 485 is rocked and in the event that the latch members 475 prevent movement of the arms 292 and the shaft 293, the bolt 496 is pushed outwardly through its bushing 495 without moving the block 487 or the shaft 293 on which it is keyed.

In the event, however, that the latch members 475 are lifted to disengage the bar 477 movement of the arm 485 is transmitted to the block 487 and the shaft 293 is rocked to move the arms 292 and carry the suction device heads 252 forward or toward the right as viewed in Fig. 4.

During this forward movement of the sheet with the suction heads 252 the suction is released from the rear suction rubbers 255 by a proper valve change from vacuum to atmosphere through the pipe 402 and as soon as the rear edge of the sheet is shifted laterally past the rear suction rubbers they are brought down on the remaining stack of sheets and hold their positions until the forward edge of the sheet has been moved into magnetic rollers and the suction on the suction rubbers 303 has been released. The arms 292 then return the front suction heads 252 into their latched position.

*Magnetic roller feed*

The forward edge of the sheet comes into position on top of a series of magnetic rollers 515 (Figs. 3, 4, and 6) keyed on a horizontal shaft 516. The shaft 516 is journaled at its ends in bearings 517 formed in the lower part of the cover frame 46. Seven rollers 515 are disclosed in the drawings and between each roller the shaft 516 is further journaled in magnetic housing 518 (Figs. 4, 6, and 11).

These magnetic housings are bolted to the rear face of an angle iron 519 which extends across and connects two roller side frames 521. A second forward angle iron 522 located parallel to the angle iron 519 also connects the side frames together. Each side frame 521 is extended rearwardly in a supporting base 523 which is bolted at 524 to the cover frame 46.

Each of the magnetic casings 518 contains a bushing 531 in which the shaft 516 freely rotates. This bushing is held securely in the casing and is surrounded by a magnetic coil 532 which sets up a magnetic field on the ends of the coil, which field envelops the rollers 515 and magnetizes these rollers. The forward edge of the sheet as it is brought over these rollers is magnetically attracted to the rollers by the combined magnetic action of the rollers themselves and also the magnetic field surrounding the casings 518 and this holds the sheet against the rollers as the latter advance it forward and out of the machine.

In this movement the sheet rides over supporting plates 535 which are mounted upon spacing blocks 536 formed in the angle irons 519, 522, these plates providing a track for the sheet. As the forward edge of the sheet passes over and beyond the forward angle iron 522 it engages a second set of magnetic rollers 537 which are mounted upon a horizontal shaft 538 journaled at its ends in bearings 539 formed in the side frames 521. This shaft is also journaled in intermediate magnetic casings 541 which, like the casings 518, are formed with bushings 542 surrounded by magnetic coils 543 which create a magnetic condition in the rollers 537 similar to that of the rollers 515.

The sheet in its passage over the plates 535 and rollers 515, 537 is held to a straight line of travel by the magnetic influence of the rollers which prevent any slipping of the sheet, both of the shafts 516, 538 being positively rotated in unison to effect the proper feeding of the sheet.

A sprocket 551 (Figs. 4 and 6) is keyed to the shaft 516 and a sprocket 552 (see also Fig. 3) is keyed to the shaft 538 and these sprockets are operated in unison by a chain 553. A chain tightener sprocket 554 is loosely carried on a stud 555 carried on a bracket 556 bolted to the angle frame 519 and maintains the chain 553 in proper working order.

The shaft 538 is the driving shaft for the rollers and for this purpose carries a gear 561 (Figs. 1, 3, and 6) keyed to its end. The gear 561 meshes with a gear 562 secured to the end of the stub shaft 157 opposite to its sprocket pinion 156. Rotation of the shaft 157 through the sprocket 156 and the chain 152, previously described, effects the proper rotation of the drive for the feeding rollers 515, 537.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A sheet handling and feeding apparatus, comprising in combination, an elevator for receiving and raising a stack of sheets, feeding devices for individually removing sheets from said stack, pairs of suction devices arranged over opposite edges of the top sheet, and air blast means cooperating with a pair of suction devices, means for inserting a second stack of sheets into said elevator while the sheets in said first stack are being fed by said feeding means, means for moving said elevator gradually, and means for moving said elevator rapidly.

2. A sheet handling and feeding apparatus, comprising in combination, an elevator for receiving a stack of sheets, actuating means for said elevator for receiving a stack of sheets, actuating means for said elevator for rapidly raising the stack, other actuating elevator means independent of said first means for raising the stack at a slower rate of travel, and means for inserting a second stack of sheets into said elevator while said first stack is being raised thereby, and pairs of suction devices arranged over opposite edges of the top sheet, and air blast means cooperating with a pair of suction devices.

3. A sheet handling and feeding apparatus, comprising in combination, an elevator for receiving a stack of sheets, actuating means for rapidly raising the stack by operation of said elevator to bring the sheets into feeding position, other actuating means independent of said first means for raising the stack at a slower feeding rate of travel to hold said sheets in substantial feeding position, feeding devices for individually removing said sheets from said stack consisting of pairs of suction devices arranged at opposite edges of the top sheet, means for inserting a second stack of sheets into said elevator while said first stack is being raised thereby, and means for stopping the lifting actions of said elevator when the top sheet in said first stack reaches its feeding position.

4. A sheet handling and feeding apparatus, comprising in combination, an elevator for receiving and raising a stack of sheets, feeding devices for individually removing sheets from said stack consisting of pairs of suction devices arranged at opposite edges of the top sheet, means for inserting a second stack of sheets into said elevator while the sheets in said first stack are being fed by said feeding means, means for stopping the lifting action of said elevator when the top sheet in said first stack is in its feeding position, and means controlled by the first stack for subsequently bringing the sheets in said other stacks into feeding position following the removal of sheets from the preceding stack.

5. A sheet handling and feeding apparatus, comprising in combination, an elevator embodying a plurality of chains having supporting members for holding a stack of sheets, actuating means for moving said chains to rapidly raise said supporting members with their superimposed stack of sheets, and other actuating means for moving said chains to raise said supporting members and said stack at a slower rate of travel.

6. A sheet handling and feeding apparatus, comprising in combination, an elevator embodying a plurality of chains having supporting members for holding stacks of sheets, actuating means for moving said chains to continuously raise said supporting members with a said stack of sheets, other actuating means for also moving said chains to intermittently raise said supporting members with said stack, and means for selectively operating one or the other of said actuating means, said chains lowering said supporting members on the downward runs of the chains and carrying them out of the path of travel of the sheets being lifted by said elevator.

7. A sheet handling and feeding apparatus, comprising in combination, an elevator for raising a stack of sheets, means for inserting a second stack of sheets into said elevator and below said first stack while the same is being lifted, and automatic means for stopping the lifting action of said elevator at predetermined intervals, the elevation of the second stack being controlled after the removal of the first stack.

8. A sheet handling and feeding apparatus, comprising in combination, an elevator for lifting a stack of sheets in a step by step movement, an electric switch opened by the stack of sheets reaching a certain vertical position, and devices operating at predetermined intervals for stopping said elevator when said electric switch is opened.

9. A sheet handling and feeding apparatus, comprising in combination, an elevator for lifting a stack of sheets and for holding the top of said stack in feeding position, suction devices for engaging the top sheet in the stack and for raising and separating it from the other sheets, means for shaking a said suction device and the sheet engaged thereby to free the latter from the sheets in the stack, conveying means mounted adjacent said stack, and means for shifting other of said suction devices to carry said separated sheet to said conveying means.

10. A sheet handling and feeding apparatus, comprising in combination, suction devices for removing the sheet from a stack of sheets, pneumatic means for moving said devices into engagement with said sheet and for raising it, pneumatic means for shaking said engaged sheet to separate it from the other sheets in the stack, conveying rollers mounted adjacent said stack, and means for shifting a said suction device to carry said separated sheet to said conveying rollers.

11. A sheet handling and feeding apparatus, comprising in combination, two sets of suction devices for engaging the top sheet in a stack of sheets, one set raising one end of the top sheet and separating it from the other sheets by shaking it above the stack, the other set of said suction devices engaging and raising the opposite end of the top sheet, conveying means mounted adjacent said stack, and means for shifting the latter set of said suction devices to carry said separated sheet to said conveying means.

12. A sheet handling and feeding apparatus, comprising in combination, two pairs of suction devices for engaging the top sheet in a stack of sheets, a said pair for engaging each end of the top sheet, conveying means mounted adjacent said stack, and means for rocking one pair of said suction devices on a stationary axis to carry said top sheet to said conveying means when each suction device of said pair is in engagement with said sheet.

13. A sheet handling and feeding apparatus, comprising in combination, supporting members for holding a stack of sheets, a pair of suction devices for engaging one end of the top sheet in the stack of sheets and holding it by suction means for raising said pair of devices with the said top sheet and separating the sheet from the other sheets, a latch associated with each suction device for locking it against lateral and shifting movement, means operative upon full suction engagement of a said suction device for releasing its latch, conveying means mounted adjacent said stack, and means for shifting said suction devices to carry said separated sheet to said conveying means when both of said suction device latches are released.

14. A sheet handling and feeding apparatus, comprising in combination, two sets of suction devices for engaging the top sheet in a stack of sheets, one set raising one end of the top sheet and separating it from the other sheets by shaking, the other set of said suction devices engaging and raising the opposite end of the top sheet, conveying means mounted adjacent said stack, means for shifting the latter set of said suction devices to carry said separated sheet to said conveying means, and means for preventing said shifting movement of said suction devices in the event that the sheet is not properly engaged thereby.

15. A sheet handling and feeding apparatus, comprising in combination, suction devices for engaging and lifting the top sheet in a stack of sheets to separate it from the other sheets, conveying rollers mounted adjacent said stack, magnetic means for magnetizing said rollers, and means for moving a said suction device laterally to bring said separated sheet into the magnetic influence of said conveying rollers.

16. A sheet handling and feeding apparatus, comprising in combination, suction devices for engaging and lifting the top sheet in a stack of sheets to separate it from the other sheets, conveying rollers mounted adjacent said stack, magnetic means for magnetizing said rollers, and means for shifting a said suction device to position said separated sheet above said rollers and within the magnetic influence of said conveying rollers.

VICTOR T. GROVER.